United States Patent
Seo et al.

(10) Patent No.: US 9,578,558 B2
(45) Date of Patent: Feb. 21, 2017

(54) METHOD AND APPARATUS FOR PERFORMING HANDOVER IN WIRELESS COMMUNICATION SYSTEM

(71) Applicant: LG ELECTRONICS INC., Seoul (KR)

(72) Inventors: Inkwon Seo, Anyang-si (KR); Hanbyul Seo, Anyang-si (KR); Eunsun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

(21) Appl. No.: 14/420,895

(22) PCT Filed: Aug. 14, 2013

(86) PCT No.: PCT/KR2013/007326
§ 371 (c)(1),
(2) Date: Feb. 10, 2015

(87) PCT Pub. No.: WO2014/027839
PCT Pub. Date: Feb. 20, 2014

(65) Prior Publication Data
US 2015/0208290 A1    Jul. 23, 2015

Related U.S. Application Data

(60) Provisional application No. 61/683,207, filed on Aug. 15, 2012, provisional application No. 61/683,724, (Continued)

(51) Int. Cl.
*H04W 4/00* (2009.01)
*H04W 36/00* (2009.01)
(Continued)

(52) U.S. Cl.
CPC .......... *H04W 36/0055* (2013.01); *H04L 1/00* (2013.01); *H04W 36/0072* (2013.01);
(Continued)

(58) Field of Classification Search
CPC combination set(s) only.
See application file for complete search history.

(56) References Cited

U.S. PATENT DOCUMENTS 8,600,393 B2 *  12/2013  Liu ................. H04W 16/14
                                                370/329
8,660,092 B2 *   2/2014  Jeon ............... H04W 36/0083
                                                370/332
(Continued)

FOREIGN PATENT DOCUMENTS

KR    10-2012-0083192    7/2012

OTHER PUBLICATIONS

Zhang et al, Enhanced Inter-Cell Interference Coordination Challenges in Heterogeneous Networks, arXiv:1112.1597v1 [cs.NI], 12 pages, Dec. 2011.*

(Continued)

*Primary Examiner* — Frank Duong
(74) *Attorney, Agent, or Firm* — Lee Hong Degerman Kang & Waimey

(57) ABSTRACT

The present invention relates to a method for a terminal to perform a handover in a wireless communication system, including the steps of: receiving a handover instruction from a serving cell; and performing a random access procedure for a target cell according to the handover instruction, wherein, when interference adjustment is performed on the serving cell and the target cell, system information for the target cell is obtained from the serving cell.

11 Claims, 13 Drawing Sheets

Related U.S. Application Data filed on Aug. 16, 2012, provisional application No. 61/693,325, filed on Aug. 26, 2012.

(51) Int. Cl.
*H04W 74/08* (2009.01)
*H04L 1/00* (2006.01)
*H04W 36/20* (2009.01)

(52) U.S. Cl.
CPC ............ *H04W 74/08* (2013.01); *H04W 36/20* (2013.01); *H04W 74/0833* (2013.01)

(56) References Cited

U.S. PATENT DOCUMENTS

| | | | |
|---|---|---|---|
| 9,100,884 B2* | 8/2015 | Son | H04W 36/0055 |
| 2011/0249642 A1 | 10/2011 | Song et al. | |
| 2011/0250892 A1 | 10/2011 | Gupta et al. | |
| 2011/0319066 A1 | 12/2011 | Chou et al. | |
| 2014/0226623 A1* | 8/2014 | Seo | H04W 36/0055 370/331 |

OTHER PUBLICATIONS

PCT International Application No. PCT/KR2013/007326, Written Opinion of the International Searching Authority dated Nov. 21, 2013, 16 pages.

Huawei, et al., "Open Issues on System Information Acquisition in felCIC," 3GPP TSG-RAN WG2 #79, R2-123934, XP50665737, Aug. 2012, 6 pages.

New Postcom, "eNB Signaling for System Information Notification in 9dB Bias," 3GPP TSG RAN WG2 #79, R2-123425, XP50665549, Aug. 2012, 2 pages.

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall Description; Stage 2 (Release 11)," 3GPP TS 36.300 V11.2.0, XP50601659, Jun. 2012, 202 pages.

European Patent Office Application Serial No. 13829462.4, Search Report dated Feb. 23, 2016, 10 pages.

\* cited by examiner

MeNB : macro eNodeB
PeNB : pico eNodeB
FeNB : femto eNodeB

MUE : macro UE
PUE : pico UE
FUE : femto eNodeB

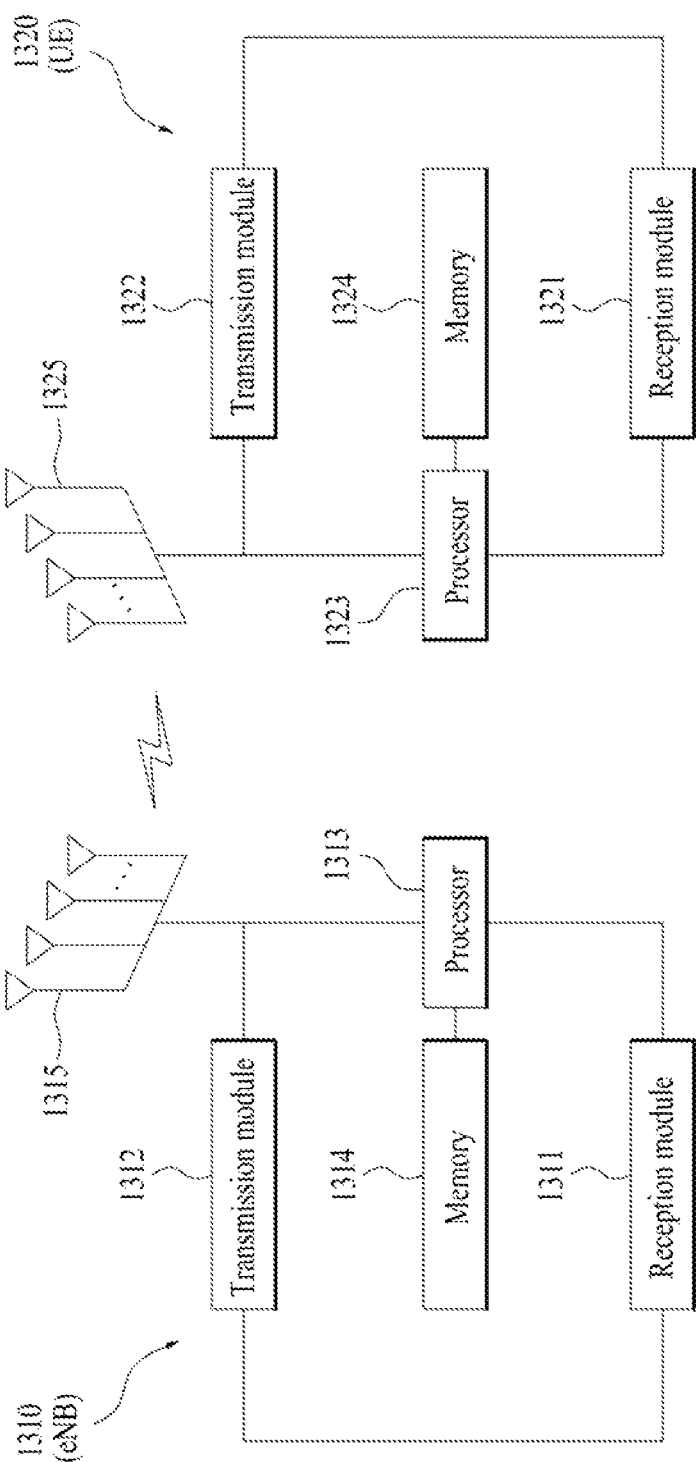

METHOD AND APPARATUS FOR PERFORMING HANDOVER IN WIRELESS COMMUNICATION SYSTEM

CROSS-REFERENCE TO RELATED APPLICATIONS

This application is the National Stage filing under 35 U.S.C. 371 of International Application No. PCT/KR2013/007326, filed on Aug. 14, 2013, which claims the benefit of U.S. Provisional Application Ser. Nos. 61/683,207, filed on Aug. 15, 2012, 61/683,724, filed on Aug. 16, 2012, and 61/693,325, filed on Aug. 26, 2012, the contents of which are all hereby incorporated by reference herein in their entirety.

TECHNICAL FIELD

Following description relates to a wireless communication system, more particularly, to a method of performing a handover in a heterogeneous network environment and an apparatus therefor.

BACKGROUND ART

A wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system, MC-FDMA (multi carrier frequency division multiple access) system and the like.

DISCLOSURE OF THE INVENTION

Technical Task

A technical task of the present invention is to efficiently obtain system information while a user equipment is performing a handover under an interference situation.

Technical tasks obtainable from the present invention are non-limited the above-mentioned technical task. And, other unmentioned technical tasks can be clearly understood from the following description by those having ordinary skill in the technical field to which the present invention pertains.

Technical Solution

According to a first technical aspect of the present invention, a method of performing a handover, by a user equipment in a wireless communication system, includes the steps of receiving a handover command from a serving cell and performing a random access procedure for a target cell according to the handover command, wherein system information of the target cell is obtained from the serving cell when performing inter-cell interference coordination for the serving cell and the target cell.

According to a second technical aspect of the present invention, a user equipment in a wireless communication system includes a reception module and a processor, the processor configured to receive a handover command from a serving cell, the processor configured to perform a random access procedure for a target cell according to the handover command, the processor configured to obtain system information of the target cell from the serving cell when performing inter-cell interference coordination for the serving cell and the target cell.

The system information of the target cell is received with the handover command.

The user equipment may assumes that system information not included in the system information received with the handover command is identical to system information of the serving cell.

The user equipment may consider system information of the serving cell as the system information of the target cell.

The system information may be transmitted on a physical broadcast channel in the serving cell.

The system information can include a system frame number, a downlink bandwidth and PHICH configuration.

The handover command can be included in an RRC connection reconfiguration information element.

The user equipment can recognize that the inter-cell interference coordination is performed via signaling indicating that the target cell corresponds to a victim cell.

The user equipment can recognize that the inter-cell interference coordination is performed when a signal related to one selected from the group consisting of a subframe set for restricted measurement, ABS (almost blank subframe) configuration and adjustment of a threshold associated with a criterion of a measurement report is received.

The user equipment can omit decoding on a physical broadcast channel transmitted from the target cell.

The user equipment is located in a CRE (cell range extension) region of the target cell.

The target cell may correspond to a victim cell interfered by the serving cell.

Advantageous Effects

According to the present invention, a user equipment can completely obtain system information even in an interference situation.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 13 is a diagram for a configuration of a transmission and reception device.

BEST MODE

Mode for invention

Figure 1:
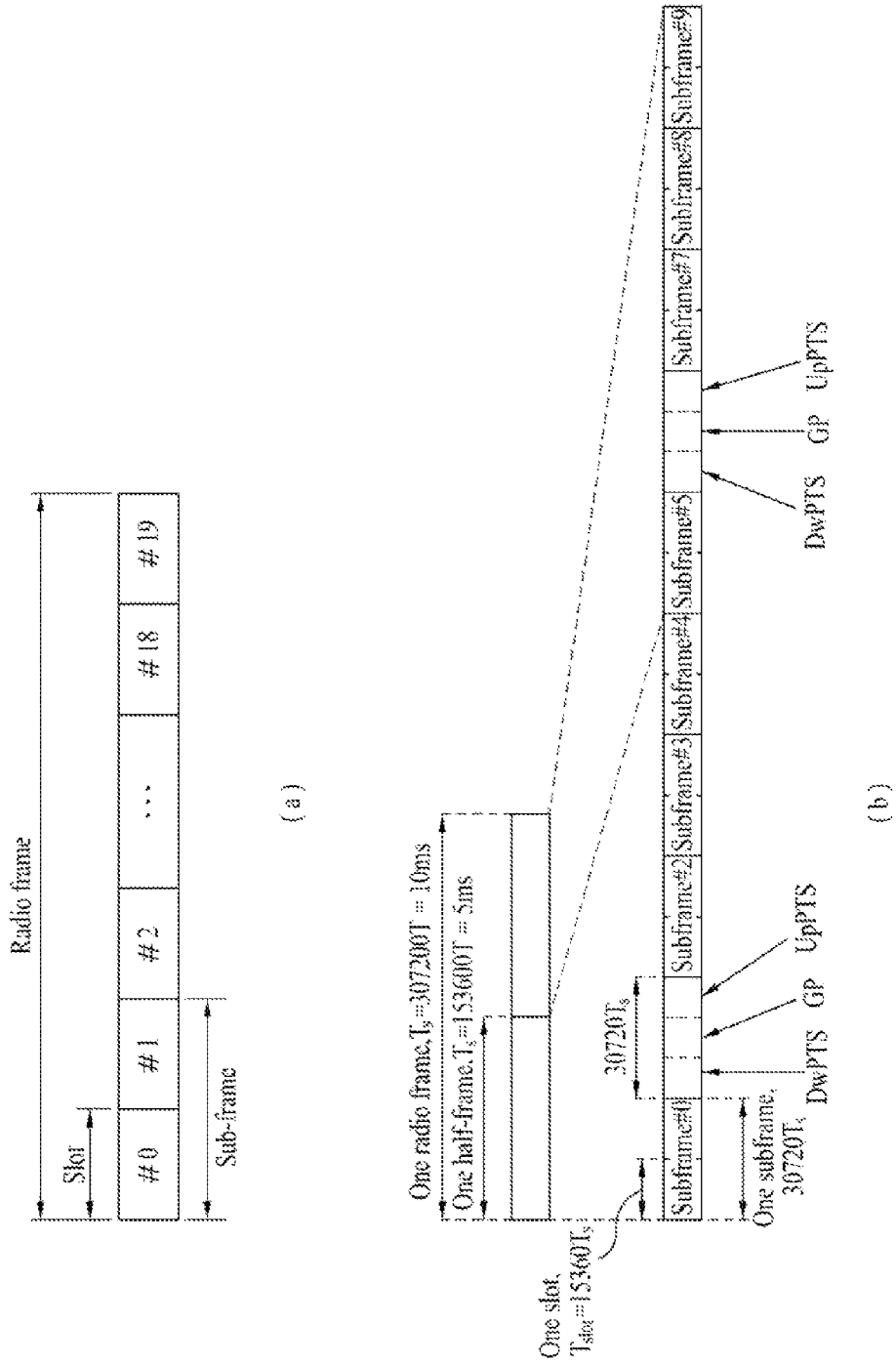
FIG. 1 is a diagram for a structure of a radio frame.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 1(*a*) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
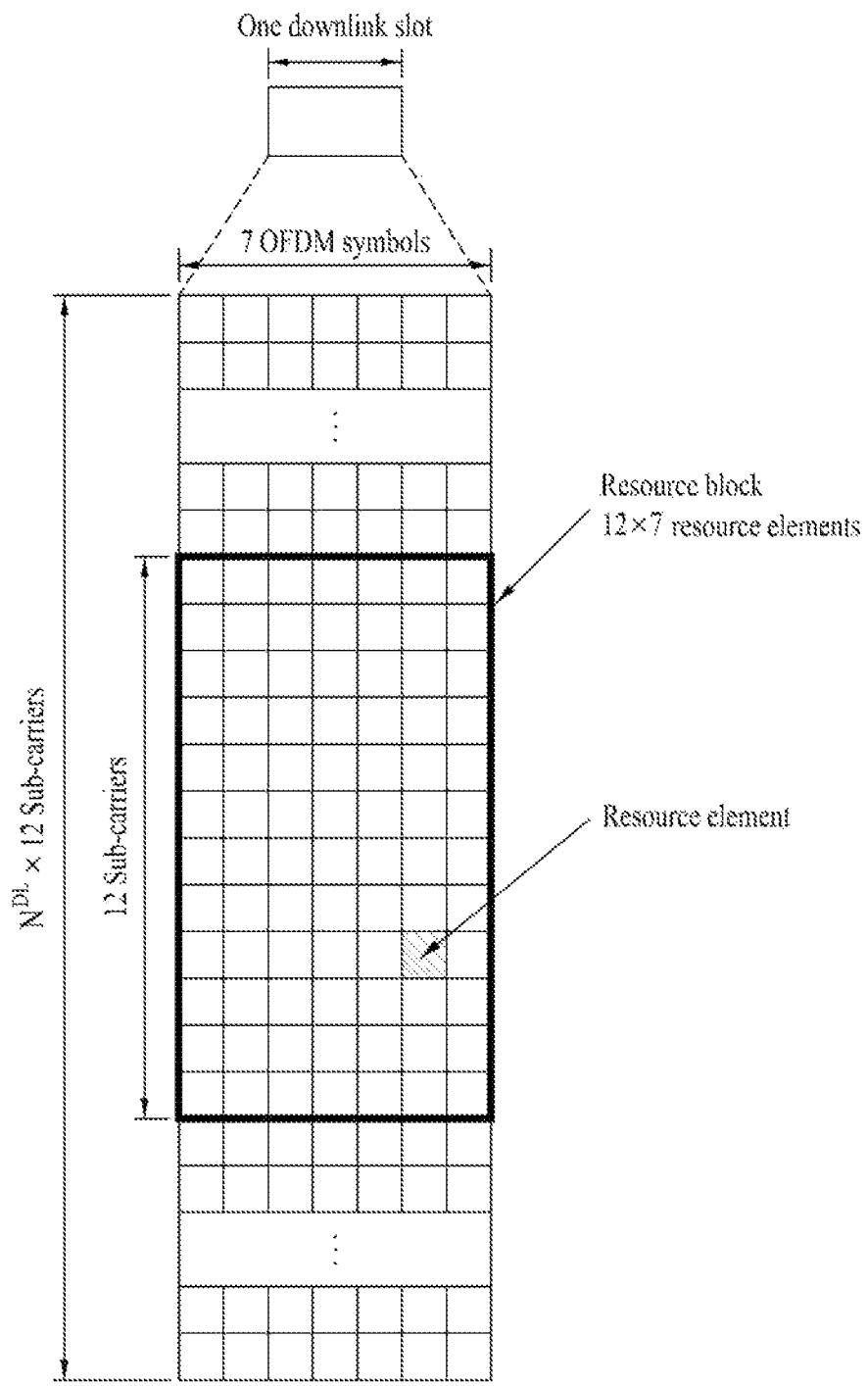
FIG. 2 is a diagram for a resource grid in a downlink (DL) slot.

FIG. 2 is a diagram for a resource grid in a downlink (DL) slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
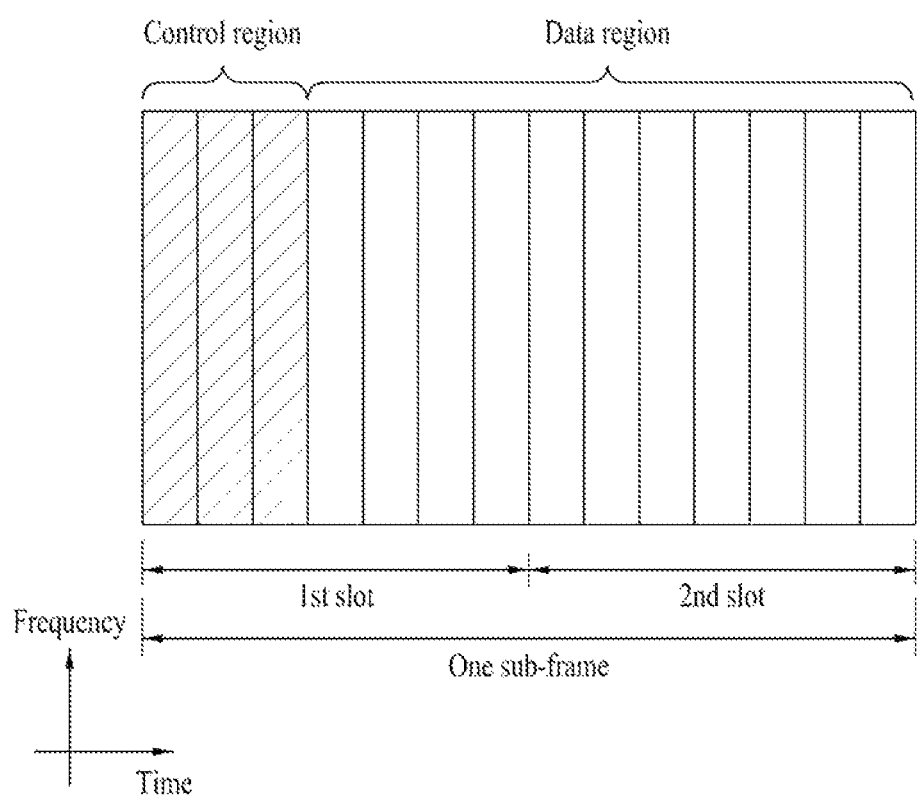
FIG. 3 is a diagram for a structure of a downlink (DL) subframe.

FIG. 3 illustrates a DL subframe structure. Up to first three OFDM symbols of the first slot in a DL subframe are used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about a UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging radio network temporary identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
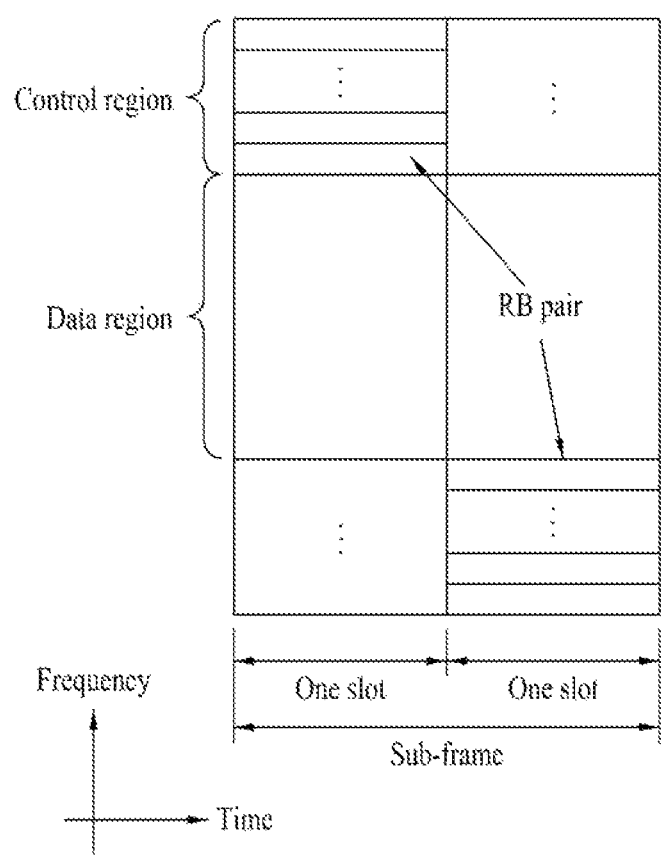
FIG. 4 is a diagram for a structure of an uplink (UL) subframe.

FIG. 4 illustrates a uplink(UL) subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Heterogeneous Deployments

Figure 5:
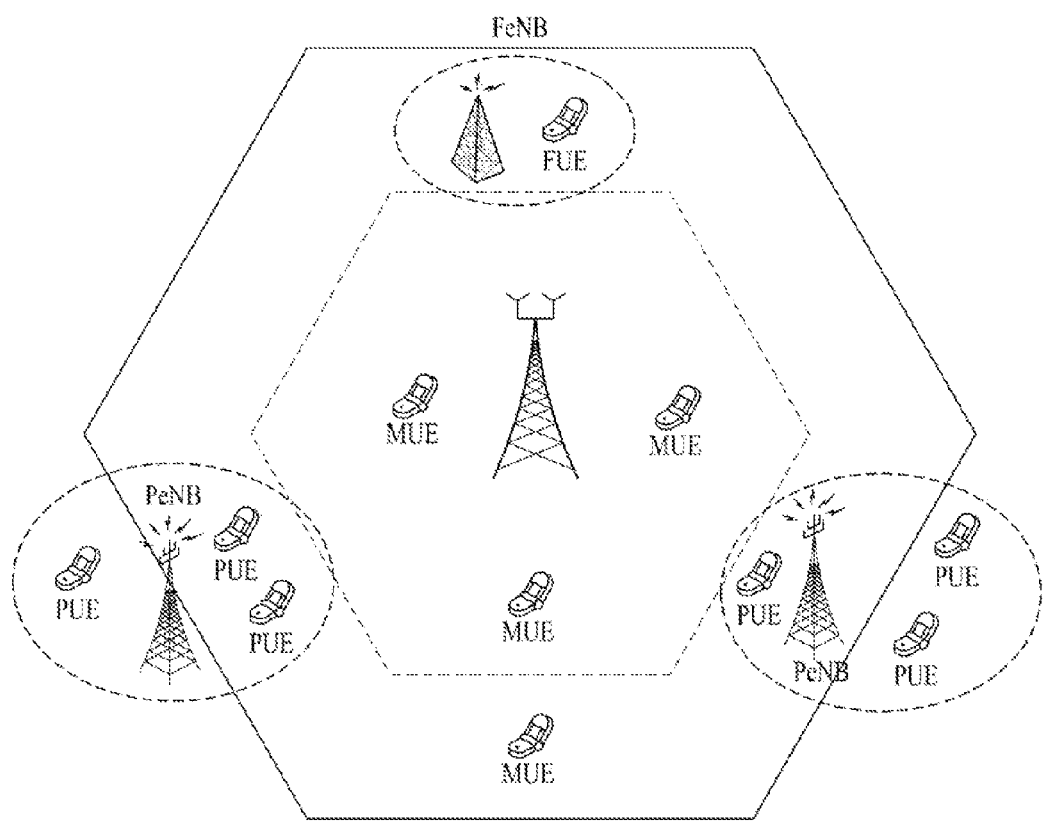
FIG. 5 is a diagram for explaining a heterogeneous network.
Figure 6:
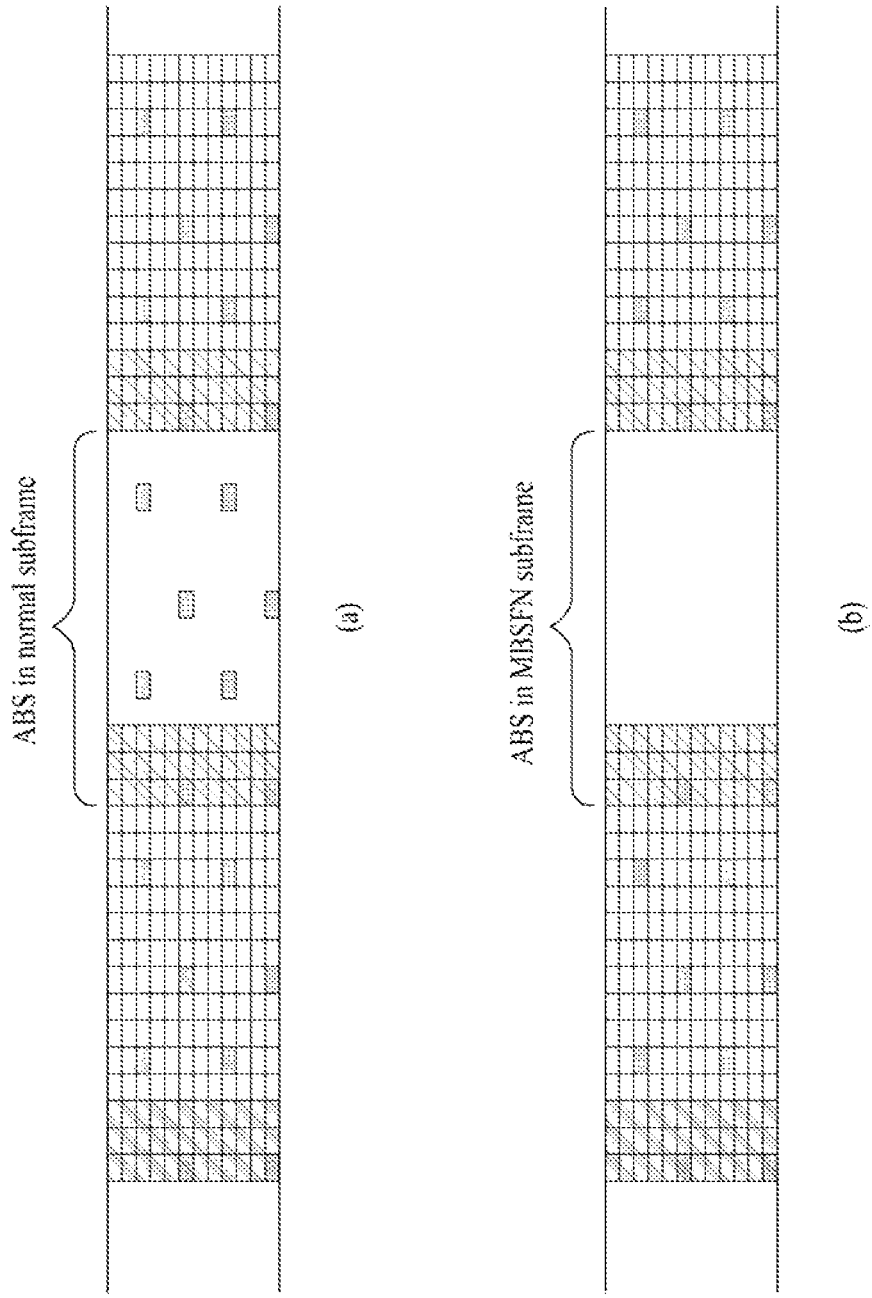
FIG. 6 is a diagram for explaining an ABS (absolute blank subframe)

FIG. 5 illustrates a heterogeneous network wireless communication system including a macro eNB (MeNB) and micro eNBs (PeNBs or FeNBs). The term "heterogeneous network" refers to a network in which an MeNB and a PeNB or FeNB coexist even when they use the same radio access technology (RAT).

The MeNB is a normal eNB of a wireless communication system having wide coverage and high transmission power. The MeNB may be referred to as a macro cell.

The PeNB or FeNB may be referred to as, for example, a micro cell, pico cell, femto cell, home eNB (HeNB), relay, etc. (the exemplified PeNB or FeNB and MeNB may be collectively referred to as transmission points). The PeNB or FeNB, a micro version of the MeNB, can independently operate while performing most functions of the MeNB. The PeNB or FeNB is a non-overlay type eNB that may be overlaid in an area covered by the MeNB or in a shadow area that is not covered by the MeNB. The PeNB or FeNB may cover a smaller number of UEs while having a narrower coverage and lower transmission power than the MeNB.

A UE (hereinafter, referred to as a macro-UE (MUE)) may be directly served by the MeNB or a UE (hereinafter, referred to as a micro-UE) may be served by the PeNB or FeNB. In some cases, a PUE present in the coverage of the MeNB may be served by the MeNB.

PeNBs or FeNBs may be classified into two types according to whether UE access is limited.

The first type is an open access subscriber group (OSG) or non-closed access subscriber group (non-CSG) eNB and corresponds to a cell that allows access of the existing MUE or a PUE of a different PeNB. The existing MUE can handover to the OSG type eNB.

The second type is a CSG eNB which does not allow access of the existing MUE or a PUE of a different PeNB. Accordingly, handover to the CSG eNB is impossible.

Inter-Cell Interference Control (ICIC)

In the heterogeneous network environment as described above, interference between neighboring cells may be a problem. To address such inter-cell interference, inter-cell interference control (ICIC) may be applied. Conventional ICIC may be applied to frequency resources or time resources.

As exemplary ICIC for the frequency resources, 3GPP LTE Release-8 defines a scheme of dividing a given frequency region (e.g., a system bandwidth) into one or more sub-regions (e.g., physical resource blocks (PRBs)) and exchanging an ICIC message for each frequency sub-region between cells. For example, as information included in the ICIC message for the frequency resources, relative narrowband transmission power (RNTP), which is related to downlink transmission power, and UL interference overhead indication (IOI) and UL high interference indication (HII), which are related to uplink interference, are defined.

The RNTP is information indicating downlink transmission power used by a cell that transmits an ICIC message in a specific frequency sub-region. For example, setting an RNTP field for a specific frequency sub-region to a first value (e.g. 0) may mean that downlink transmission power of a corresponding cell does not exceed a predetermined threshold value in the specific frequency sub-region. Setting the RNTP field for the specific frequency sub-region to a second value (e.g., 1) may mean that the corresponding cell cannot guarantee the downlink transmission power in the specific frequency sub-region. In other words, the downlink transmission power of the cell can be regarded as low when the RNTP field is 0, whereas the downlink transmission power of the cell cannot be regarded as low when the RNTP field is 1.

The UL IOI is information indicating the amount of uplink interference that a cell transmitting an ICIC message suffers from (or is subjected to) in a specific frequency sub-region. For example, an IOI field for a specific frequency sub-region set to a value corresponding to a high amount of interference may suggest that a corresponding cell suffers strong uplink interference in the specific frequency sub-region. In a frequency sub-region corresponding to IOI indicating strong uplink interference, a cell having received an ICIC message may schedule UEs that use low uplink transmission power from among UEs thereof. Thereby, UEs perform uplink transmission with low transmission power in the frequency sub-region corresponding to the IOI indicating strong uplink interference, and thus uplink interference that a neighboring cell (i.e. a cell having transmitted the ICIC message) suffers may be attenuated.

The UL HII is information indicating a degree of interference (or uplink interference sensitivity) that may be generated for a corresponding frequency sub-region according to uplink transmission in a cell transmitting an ICIC message. For example, if an HII field is set to a first value (e.g., 1) for a specific frequency sub-region, it may suggest that the cell transmitting the ICIC message can schedule UEs having high uplink transmission power for the specific frequency sub-region. On the other hand, it may suggest that the cell transmitting the ICIC message can schedule UEs having low uplink transmission power for the specific frequency sub-region when the HII field is set to a second value (e.g., 0) for the specific frequency sub-region. Meanwhile, a cell having received the ICIC message may avoid interference from the cell having transmitted the ICIC message by scheduling UEs preferentially in a frequency sub-region for which the HII field is set to the second value (e.g., 0) and scheduling UEs capable of successfully operating in a strong interference environment in a frequency sub-region for which the HII field is set to the first value (e.g., 1).

As exemplary ICIC for the time resources, 3GPP LTE-A (or 3GPP LTE Release-10) defines a scheme of dividing the entire time domain into one or more time sub-regions (e.g., subframes) in the frequency and exchanging information about whether silencing is performed for each time sub-region between cells. A cell transmitting an ICIC message may transmit, to neighboring cells, information indicating that silencing is performed in a specific subframe, and does not schedule a PDSCH or a PUSCH in the specific subframe. The cell receiving the ICIC message may schedule uplink and/or downlink transmission for UEs in the subframe in which silencing is performed in the cell having transmitted the ICIC message.

Silencing may refer to an operation in which a specific cell does not transmit signals (or transmits zero power or weak power) in a specific subframe on uplink and downlink. As an example of silencing, a specific cell may set a specific subframe as an almost blank subframe (ABS). There may be two types of ABSs. Specifically, one type is an ABS in a normal subframe in which a cell specific reference signal (CRS) is transmitted while a data region is left vacant and the other type is an ABS in an MBSFN subframe in which even the CRS is not transmitted. In the ABS in a normal subframe, there may be some interference due to the CRS. The ABS in an MBSFN subframe has an advantage in terms of interference, but use thereof is limited. Accordingly, the two ABSs may be used together.

Handover

Hereinafter, handover and the random access procedures conducted in an LTE system will be discussed in detail.

Figure 7:
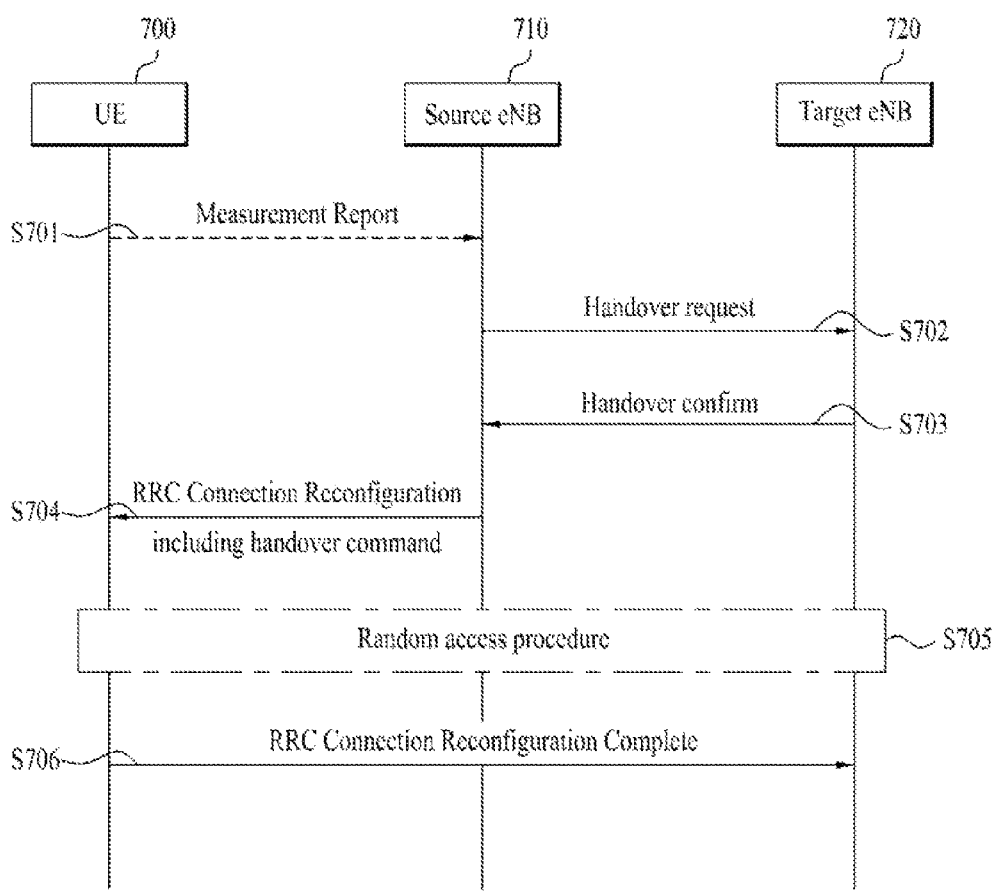
FIG. 7 is a flowchart for explaining a handover procedure.

FIG. 7 is a diagram illustrating a handover procedure. Referring to FIG. 7, when a handover trigger occurs while a UE 700 monitors measurement values from a serving eNB 710 currently connected to the UE 700 and neighboring cells, the UE 700 transmits a measurement report message to the serving eNB 710 (S701). Herein, the measurement report may include reference signal receive power (RSRP), received signal strength indicator (RSSI), and reference signal received quality (RSRQ).

RSRP is a measurement value that can be obtained by measuring the magnitude of a CRS on downlink. RSSI, which is a value of total reception power received by a UE, is a measurement value including interference and noise power from neighboring cells. RSRQ is a measurement value measured in the form of N*RSRP/RSSI, where N is the number of RBs of a corresponding bandwidth obtained through RSSI measurement.

Whether to transmit a measurement report may be determined according to the following event-based measurement report decision conditions.

i) A measurement value for the serving cell is greater than an absolute threshold value (Serving cell becomes better than absolute threshold).

ii) A measurement value for the serving cell is less than the absolute threshold value (Serving cell becomes worse than absolute threshold).

iii) A measurement value for a neighboring cell is greater than a measurement value of the serving cell by an offset value (Neighboring cell becomes better than an offset relative to the serving cell).

iv) A measurement value for a neighboring cell is greater than an absolute threshold value (Neighboring cell becomes better than absolute threshold).

v) A measurement value for the serving cell is less than the absolute threshold value, and a measurement value for a neighboring cell is greater than another absolute threshold value (Serving cell becomes worse than one absolute threshold and Neighboring cell becomes better than another absolute threshold).

Herein, the measurement value may be an RSRP or the like.

In addition, a measurement report may be transmitted only when each of the measurement report decision conditions described above is maintained for at least a predetermined time set in the network.

Figure 8:
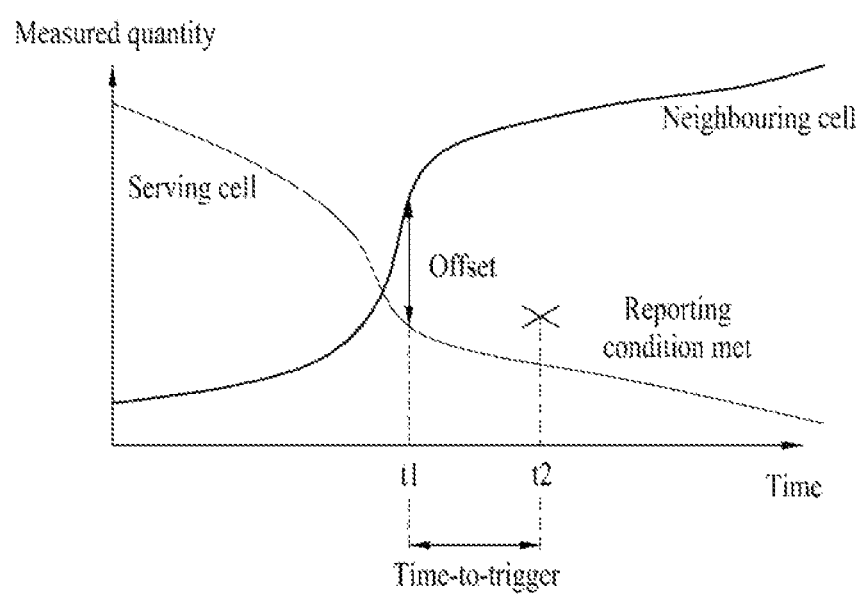
FIG. 8 is a diagram for explaining determination of whether to transmit a measurement report in a handover procedure.

Of the measurement report decision conditions, condition iii) will be described in detail below with reference to FIG. 8. A UE persistently measures RSRP and the like for the serving cell and a neighboring cell. As the UE keeps approaching the neighbor cell, if a predetermined time (time to trigger) t2 elapses after a specific time t1 at which the RSRP for the neighboring cell is higher than the RSRP for the serving cell by an offset value, the UE may perform measurement reporting to the serving cell. Herein, the offset value and the predetermined time may be set by the network.

Subsequently, the serving eNB 710 having received the measurement report from the UE 700 transmits a handover request to a target eNB 720 (S702). At this time, the serving eNB 710 provides radio resource control (RRC) context information of the UE 700 to the target eNB 720.

The target eNB 720 determines, based on the RRC context information, whether the UE is to be handed over. If the handover is determined, the target eNB 720 generates a handover command, and the serving eNB 710 transmits an RRC connection reconfiguration (RRCConnectionReconfiguration) message including the handover command to the UE 700 (S704). The RRC connection reconfiguration message may include radio resource configuration information, security configuration, and cell-RNTI (C-RNTI), which are commonly applied to the UEs covered by the target eNB 720.

Upon receiving the RRC connection reconfiguration message, the UE 700 initiates a procedure of random access to the target eNB 720 (S705). When the random access procedure is successfully completed, the UE 700 transmits an RRC connection reconfiguration complete (RRC ConnectionReconfigurationComplete) message to the target eNB 720, thereby terminating the handover procedure (S706).

Hereinafter, the random access procedure of the handover procedure will be described in detail. In LTE, a UE can perform the random access procedure in the following cases.

The UE performs initial access since there is no RRC connection to an eNB.

The UE accesses a target cell for the first time in a handover procedure.

The random access procedure is requested by a command of the eNB.

Data for uplink occurs when uplink time synchronization is not implemented, or a predetermined radio resource used to request a radio resource is not allocated.

A recovery procedure is performed due to radio link failure or a handover failure.

Hereinafter, a normal contention-based random access procedure will be described.

Figure 9:
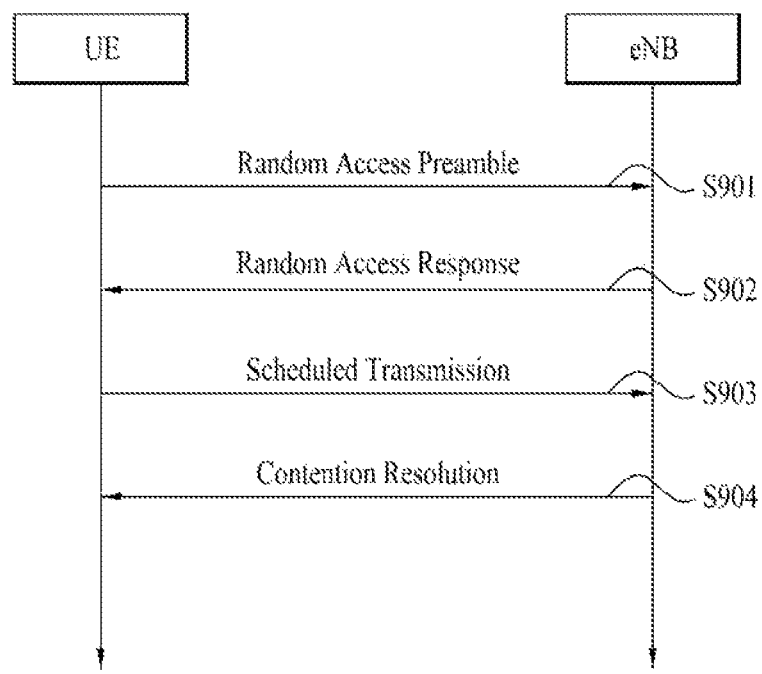
FIG. 9 is a flowchart for explaining a random access procedure.

FIG. 9 is a diagram illustrating operational processes for a UE and an eNB in a contention-based random access procedure.

(1) Transmission of First Message

A UE may randomly select a random access preamble from a set of random access preambles indicated through system information or a Handover Command, select a Physical RACH (PRACH) resource capable of carrying the random access preamble, and transmit the random access preamble in the PRACH resource (S901).

(2) Reception of Second Message

After transmitting the random access preamble, the UE attempts to receive a random access response thereof within a random access response reception window indicated through the system information or Handover Command by an eNB (S902). More specifically, the random access response information may be transmitted in the format of a MAC (Media Access Control) PDU (Protocol Data Unit) and the MAC PDU may be transmitted on a PDSCH. To properly receive the information transmitted on the PDSCH, the UE preferably monitors a physical downlink control channel (PDCCH). That is, the PDCCH preferably carries information about a UE to receive the PDSCH, frequency and time information about radio resources of the PDSCH, and information about the transmission format of the PDSCH. Once the UE succeeds in receiving a PDCCH transmitted thereto, the UE may properly receive the random access response on the PDSCH based on the information of the PDCCH. The random access response may include a random access preamble identifier (RAPID), a UL Grant indicating UL radio resources, a Temporary C-RNTI, and a Timing Advance Command (TAC).

As described above, the RAPID is needed in the random access response to indicate a UE to which the UL Grant, the Temporary C-RNTI, and the TAC are valid since one random access response may include random access response information for one or more UEs. It is assumed in this step that the UE selects a RAPID identifying the random access preamble that has been selected in step S902. Thus, the UE may receive the UL Grant, the Temporary C-RNTI, and the timing advance command (TAC).

(3) Transmission of Third Message

If the UE receives a valid random access response, the UE processes the information included in the random access response. That is, the UE applies the TAC and stores the Temporary C-RNTI. In addition, the UE may store data to be transmitted in a message-3 buffer, in response to the received valid random access response.

The UE transmits the data (i.e., a third message) to the eNB based on the received UL Grant (S903). The third message should include an ID of the UE. This is because the eNB cannot determine which UEs perform the random access procedure in the contention-based random access procedure and the UEs need to be identified for contention resolution.

Two methods have been discussed to include a UE ID in the third message. According to a first method, if the UE has a valid C-RNTI already allocated by a corresponding cell before the random access procedure, the UE transmits the C-RNTI by a UL transmission signal corresponding to the UL Grant. On the other hand, if a valid C-RNTI has not been allocated to the UE before the random access procedure, the UE transmits its unique ID (e.g., an SAE Temporary Mobile Subscriber Identity (S-TMSI) or a Random ID) in the third message. In general, a UE ID is longer than a C-RNTI. Once the UE has transmitted data corresponding to the UL Grant, the UE starts a contention resolution timer (hereinafter referred to as "CR timer").

(4) Reception of Fourth Message

After transmitting the data including its ID according to the UL Grant included in the random access response, the UE awaits instruction from the eNB, for contention resolution. That is, the UE attempts to receive a PDCCH in order to receive a specific message (S904). There are two methods for receiving the PDCCH. As described above, if the third message transmitted according to the UL Grant includes a C-RNTI, the UE attempts to receive a PDCCH using the C-RNTI thereof. If the third message includes the UE ID, the UE may attempt to receive a PDCCH using the Temporary C-RNTI included in the random access response. In the former case, if the UE receives the PDCCH using the C-RNTI thereof before the CR timer expires, the UE determines that the random access procedure has been normally performed and terminates the random access procedure. In the latter case, if the UE receives a PDCCH using the Temporary C-RNTI before the CR timer expires, the UE checks data received on a PDSCH indicated by the PDCCH. If the data includes the ID of the UE, the UE determines that the random access procedure has been normally performed and terminates the random access procedure.

In the case of non-contention-based random access, the random access procedure is terminated simply by transmitting the first and second messages, unlike the case of the contention-based random access procedure illustrated in FIG. 9. Note that before the UE transmits a random access preamble as the first message to the eNB, the eNB allocates the random access preamble to the UE. The UE transmits the allocated random access preamble as the first message to the eNB and receives a random access response from the eNB. Thereby, the random access procedure is terminated.

PSS (Primary Synchronous Signal)/SSS (Secondary Synchronous Signal)

Figure 10:
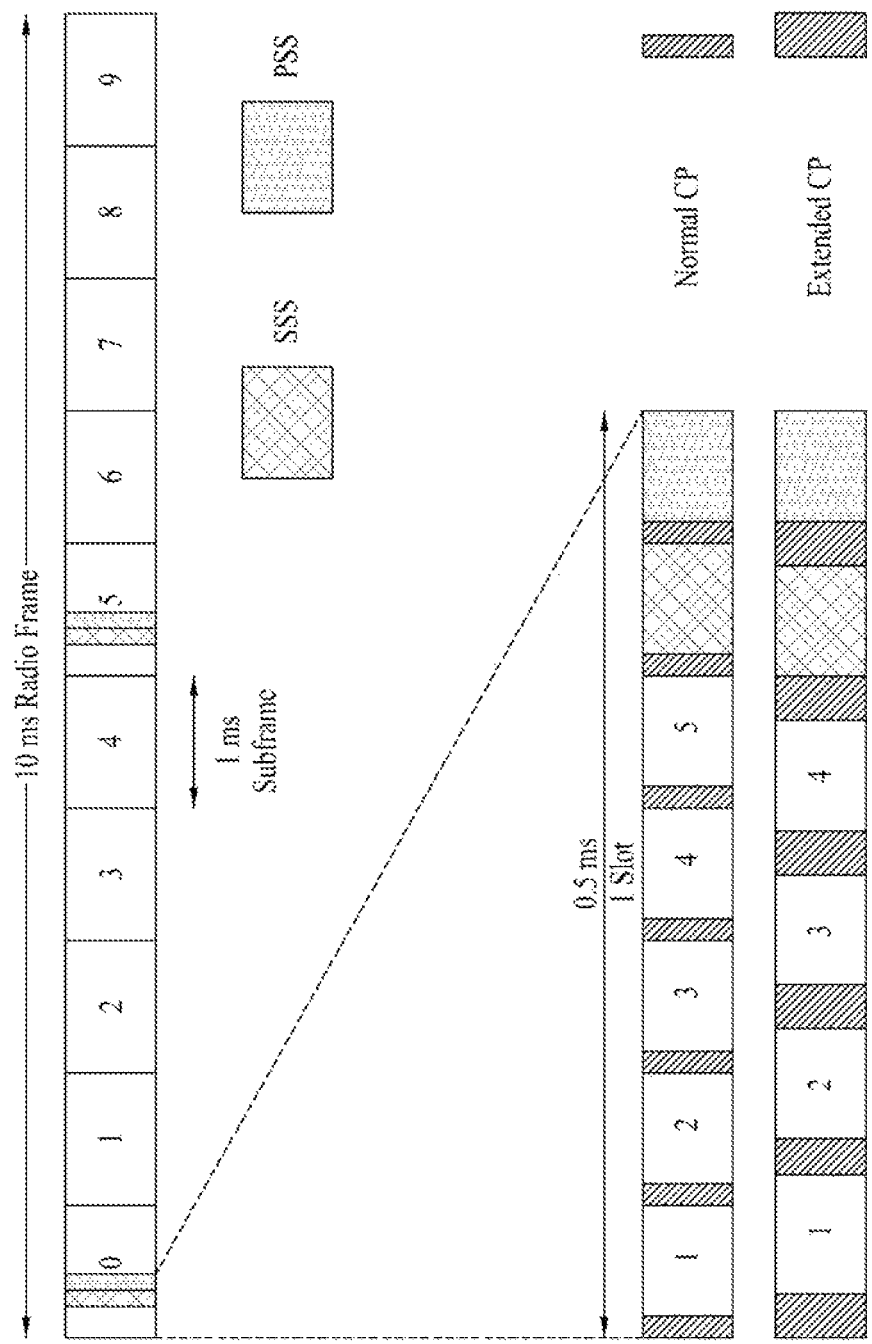
FIG. 10 is a diagram for explaining a PSS/SSS in FDD system.

FIG. 10 is a diagram for explaining a PSS and an SSS corresponding to synchronization signals used for a cell search in LTE/LTE-A system. Before the PSS and the SSS are explained, a cell search is explained. When a user equipment initially accesses a cell, the cell search is performed for a case of performing a handover from the currently accessed cell to a different cell, a case of reselecting a cell or the like. The cell search may include acquisition of frequency and symbol synchronization for a cell, acquisition of downlink frame synchronization for a cell and determination of a cell identifier (ID). One cell group consists of three cell identifiers and there may exist 168 cell groups.

An eNB transmits a PSS and an SSS to perform a cell search. A user equipments obtains 5 ms timing of a cell by detecting the PSS and may be able to know a cell identifier included in a cell group. And, the user equipment is able to know radio frame timing and a cell group by detecting the SSS.

Referring to FIG. 10, a PSS is transmitted in a $0^{th}$ and a $5^{th}$ subframe. More specifically, the PSS is transmitted on the last ODFM symbol of a first slot of the $0^{th}$ subframe and the last OFDM symbol of a first slot of the $5^{th}$ subframe, respectively. And, the SSS is transmitted on the last but one OFDM symbol of the first slot of the $0^{th}$ subframe and the last but one OFDM symbol of the first slot of the $5^{th}$ subframe, respectively. In particular, the SSS is transmitted on an OFDM symbol right before an OFDM symbol on which the PSS is transmitted. The aforementioned transmission timing corresponds to a FDD case. In case of TDD, the PSS is transmitted on a third symbol of the $1^{st}$ subframe and a third symbol of a $6^{th}$ subframe (i.e., DwPTS) and the SSS is transmitted on the last symbol of a $0^{th}$ subframe and the last symbol of a $5^{th}$ subframe. In particular, the SSS is transmitted on a symbol preceding as many as 3 symbols of a symbol on which the PSS is transmitted in the TDD.

The PSS corresponds to a Zadoff-Chu sequence of a length of 63. The PSS is actually transmitted on 73 center subcarriers (72 subcarriers except a DC subcarrier, i.e., 6 RBs) of a system frequency bandwidth in a manner that 0 is padding to both ends of the sequence. The SSS consists of a sequence of a length of 62 in a manner that two sequences each of which has a length of 31 are frequency-interleaved. Similar to the PSS, the SSS is transmitted on the center 72 subcarriers of the whole system bandwidth.

PBCH (Physical Broadcast Channel)

Figure 11:
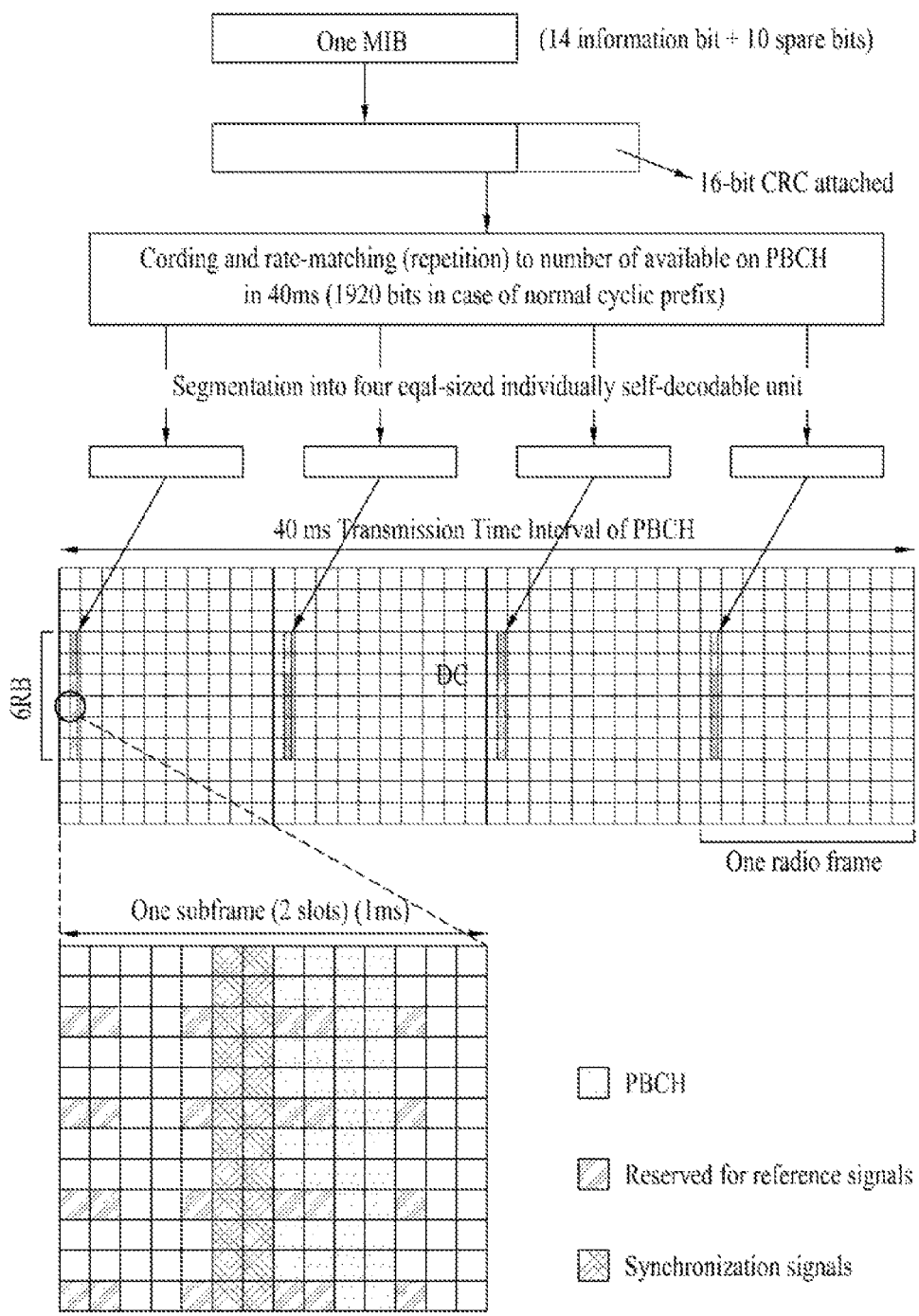
FIG. 11 is a diagram for explaining PBCH.

FIG. 11 is a diagram for explaining PBCH. The PBCH corresponds to a channel on which system information corresponding to a master information block (MIB) is transmitted. The PBCH is used to obtain system information after a user equipment obtains synchronization and a cell identifier via the aforementioned PSS/SSS. In this case, downlink cell bandwidth information, PHICH configuration information, a subframe number (a system frame number (SFN)) and the like can be included in the MIB.

As shown in FIG. 11, one MIB transport block is transmitted via a first subframe in each of 4 consecutive radio frames. More specifically, PBCH is transmitted on first 4 OFDM symbols of a second slot of a $0^{th}$ subframe in the 4 consecutive radio frames. Hence, the PBCH configured to transmit a MIB is transmitted with an interval of 40 ms. The PBCH is transmitted on center 72 subcarriers of a whole bandwidth in frequency axis. The center 72 subcarriers correspond to 6 RBs corresponding to a smallest downlink bandwidth. This is intended to make a user equipment decode BCH without any problem although the user equipment does not know a size of the whole system bandwidth.

CRE (Cell Range Extension)

When UEs getting a service from a macro eNB are enabled to make a handover to a pico eNB in a manner of installing a plurality of small pico eNBs in coverage of the macro eNB, it may be able to obtain traffic offloading effect of the macro eNB. In case of performing a handover from a serving eNB to a target eNB, the handover is performed when a measurement result, which is measured by a UE, for the target eNB is greater than a prescribed threshold value ($S_{th\_conv}$). In this case, although signal strength (e.g., SINR) of the target eNB is lower than the prescribed threshold value ($S_{th\_conv}$), it may be able to make a handover to be performed in a manner that a network additionally uses a random means or improves capability of the UE. This operation can be called by such a terminology as CRE (cell range expansion). A region where the CRE is available is called a CRE region or a CRE area. The CRE region can be represented by a region where a reference signal reception capability ($S_{received}$) of a corresponding eNB is greater than a new threshold value ($S_{th\_CRE}$) for the CRE. In particular, the CRE region corresponds to a region satisfying Formula 1 in the following.

$$S_{th\_conv} >= S_{received} >= S_{th\_CRE} \quad \text{[Formula 1]}$$

Figure 12:
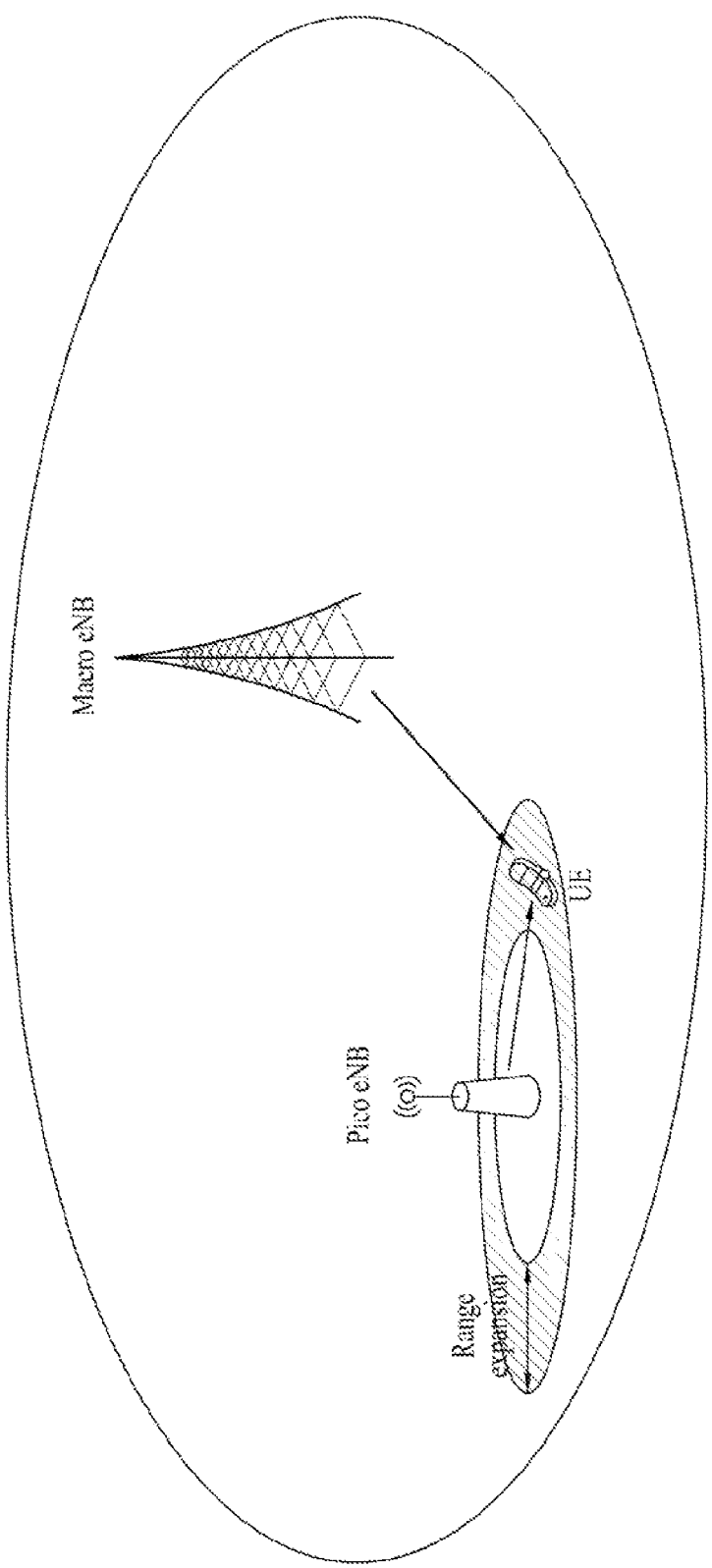
FIG. 12 is a diagram for explaining synchronization and system information obtained according to embodiment of the present invention.

To help understand the CRE region, referring to FIG. 12, the CRE region satisfying Formula 1 may correspond to a shaded part.

In FIG. 12, a macro eNB can make a UE (a PUE) situating at a CRE region handover to a pico eNB (a PeNB) and can perform traffic offloading. By doing so, total system throughput can be enhanced. Consequently, CRE can make a cell range or a cell radius of a corresponding eNB to be expanded. In a legacy LTE/LTE-A system, reference signal reception strength of a pico eNB can be represented by RSRP/RSRQ and a criterion of a UE capable of attaching to a specific cell corresponds to a difference between best RSRP and RSRP of the specific cell less than 6 dB on the basis of RSRP of each cell. In order to more effectively obtain traffic offloading effect to the pico eNB, the criterion can be adjusted to be higher than 6 dB (e.g., 9 dB). In this case, when the UE measures the pico eNB, performs a handover to the pico eNB for the CRE and measures the pico eNB corresponding to a serving cell after the handover is performed, impact of interference caused by the macro eNB (including other eNBs (not depicted) adjacent to the pico eNB) cannot help but increase.

As mentioned in the foregoing description, in LTE/LTE-A system, a UE obtains downlink synchronization using a PSS/SSS and may be able to obtain system information corresponding to MIB via PBCH. Yet, in such a situation as FIG. 12, when a UE receives a PSS/SSS/PBCH from a second transmission point to obtain synchronization of the second transmission point (pico eNB), strong signal strength from a first transmission point (macro eNB) may act as strong interference (in terms of an interfering source and an interfered source, the first transmission point, the second transmission point and the UE can be called an aggressor cell, a victim cell and a victim UE, respectively). In the following, methods for a UE to completely obtain synchronization and system information (e.g., system information transmitted via PBCH) in an interference situation according to the present invention are disclosed.

Obtaining Synchronization in Interference Situation

In the following description, a synchronization signal can be comprehended as one of a signal including both a PSS and an SSS and a signal including the PSS only.

Referring to FIG. 12, power of a UE situating at an extended range of a second transmission point is turned on and the UE may initially access a system. In this case, since signal strength from a first transmission point (macro eNB) is stronger than signal strength from the second transmission point (pico eNB) in the extended range, the UE may perform initial access to the first transmission point. Subsequently, the first transmission point can indicate the UE to make a handover to the second transmission point. When the handover is indicated, the first transmission point can transmit information including a subframe offset between the first transmission point and the second transmission point to the UE. For instance, the first transmission point can additionally transmit the information in a manner of adding the information including the subframe offset to an RRCConnectionRconfiguration message or a handover message. The UE can obtain synchronization of the second transmission point using the subframe offset received from the first transmission point and a synchronization signal transmitted from the first transmission point without detecting a PSS/SSS transmitted from the second transmission point.

Subsequently, referring to FIG. 12, the UE performs an initial synchronization process again for the second transmission point when the UE currently accessed the second transmission point and situating at the extended range of the second transmission point loses connection with the second transmission point. As mentioned in the foregoing description, since the signal strength from the first transmission point is stronger than the signal strength from the second transmission point, the UE situating at the extended range may use a synchronization signal and a subframe offset transmitted from the first transmission point in case of performing synchronization with the second transmission point. In this case, the UE does not need to perform synchronization using a PSS/SSS transmitted from the second transmission point.

In this case, the UE may use a subframe offset which is received when the UE initially accesses the first transmission point or a subframe offset which is received (from the first transmission point) when the UE performs the handover to the second transmission point from the first transmission point. This is because most of UEs positioned at the extended range accesses the first transmission point of which signal strength is relatively strong and then accesses the second transmission point according to a handover command. Hence, the UE uses the subframe offset which is received in the handover process (e.g., the subframe offset included in the RRCConnectionRconfiguration message transmitted with the handover command). Moreover, information (e.g., RSRP of the first transmission point and RSRP of the second transmission point etc.) which are used when the handover is made to the second transmission point from the first transmission point can also be reused in this process.

In particular, when the UE, which has lost connection with the second transmission point, situating at the extended rage attempts an initial access to the second transmission point, if a surrounding situation (e.g., RSRP of the first transmission point and RSRP of the second transmission point) is similar to a surrounding situation at the time of performing handover, information at the time of performing the handover is used. In other word, when a specific UE accesses the first transmission point and then makes a handover to the second transmission point, if the specific UE obtains synchronization of the second transmission point using a synchronization signal and a subframe offset of the first transmission point, the specific UE can be configured to perform synchronization with the second transmission point using the synchronization signal and the subframe offset of the first transmission point in the future in case that the specific UE accesses the second transmission point due to such a situation as connection lost and the like.

As a further different situation, in FIG. 12, when a UE situating at a region of a first transmission point or a UE (not depicted) belonging to a transmission point (e.g., a third transmission point) adjacent to a second transmission point performs neighbor cell measurement for the second transmission point, as mentioned in the foregoing description, it may use a synchronization signal and a subframe offset of the first transmission point of which signal strength is relatively strong. To this end, the UE can receive signaling of a subframe offset (or, if the current serving cell corresponds to a third transmission point, a subframe offset between the first transmission point and the second transmission point) of a serving cell and a subframe offset of the second transmission point from a currently accessed transmission point (i.e., the serving cell). And, the UE can additionally receive signaling of whether a subframe boundary (or a subframe boundary of the first transmission point and a subframe boundary of the second transmission point) of the serving cell and a subframe boundary of the second transmission point are matched with each other.

In the above-mentioned example, the subframe offset can also be obtained from information on each cell of a cell list measured by the UE. Specifically, the cell list may include the subframe offset between the serving cell and a neighboring cell and/or information on whether the subframe boundary of the serving cell is matched with a subframe boundary of the neighboring cell. And, if there exists a macro cell including a pico cell among neighboring cells, the cell list may include a subframe offset between the macro cell and the pico cell and/or information on whether a subframe boundary of the macro cell is matched with a subframe boundary of the pico cell. In other word, as shown in FIG. 12, if there exists a pair of pico cells interfered by the macro cell in the neighbor cell list, a relationship between the pair of pico cells and the macro cell can be specified in the neighbor cell list and a subframe offset of the pair and/or information on whether a subframe boundary of the pair is matched with each other can be included in the neighbor cell list. In particular, information on a cell pair performing eICIC among neighboring cells can be signaled to the UE.

Meanwhile, as mentioned in the foregoing description, according to a method of obtaining synchronization of a second transmission point using a synchronization signal (a PSS except an SSS) and a subframe offset, since it is difficult for a UE to know information on a CP length of the second transmission point, it is necessary for considering this. According to the present invention, the UE can obtain the information on the CP length of the second transmission point from a first transmission point. Or, the UE can be configured to estimate that the CP length of the second transmission point is identical to a CP length of the first transmission point. In this case, the estimation that the CP length of the second transmission point is identical to the CP length of the first transmission point can be limitedly applied to cells performing eICIC only. The estimation can be applied when a PSS/SSS of an aggressor cell is detected and the detected PSS/SSS is used for synchronizing a victim cell. In addition, the estimation can be limitedly applied to a specific operation in the following. For instance, in order to minimize interference on a specific signal, the specific operation may include an operation that a partial resource in which the interference on the specific signal exist is configured to perform transmitter-side rate matching or use receiver-side puncturing. Or, the specific operation may also include a use of an interference cancellation receiver used for eliminating inter-cell interference. This is because an interference signal is detected/eliminated in frequency domain by performing FFT (Fast Fourier Transform) on whole signals in which the interference signal is included and the interference cancellation receiver configured to perform an operation of detecting a signal of a preferred transmission point can be applied only when an OFDM symbol boundary is matched with each other in a manner that a CP length of each transmission point is identical to each other. Yet, in case of performing interference cancellation in time domain, in particular, in case of performing FFT on an interference signal, reproducing an interference signal, generating a time domain waveform of the interference signal again via IFFT (inverse FFT) and eliminating the time domain waveform from whole reception signal, the interference cancellation in time domain can be performed irrespective of whether a CP length is matched with each other. Hence, in case of using the interference cancellation receiver, a network can inform a UE of information on whether interference cancellation is performed using frequency domain interference detection/elimination or time domain interference detection/elimination via an initial access process and the like.

As a further different method for a UE to obtain synchronization in an interference situation, if a first transmission point and a second transmission point correspond to cells in which ICIC is performed, the UE may assume that a time boundary (e.g., a subframe boundary, a frame boundary, a BCH start position and the like) is matched with each other between the first transmission point and the second transmission point. In this case, whether the time boundary is matched with other can be indicated via RRC signaling and the like. If the assumption that the time boundary is matched with each other means matching of a subframe boundary only, it may signal the aforementioned subframe offset and an SFN of the second transmission point can be determined by an SFN of the first transmission point and the signaled subframe offset. For instance, if the SFN of the first transmission point corresponds to 10, if the subframe offset ranges from 0 to 10, the SFN of the second transmission point can be determined by 10. If the subframe offset ranges from 11 to 20, the SFN of the second transmission point can be determined by 11.

Obtaining System Information in Interference Situation

In the following, a method for a UE to obtain system information (e.g., an SFN, PHICH configuration (PHICH-Config), a downlink bandwidth and the like transmitted via PBCH) is explained. For clarity, assume that the UE receives a handover command from a first transmission point (a serving cell) and performs a handover to a second transmission point (a target cell) for example. Yet, it should not be limitedly comprehended as the following description is applied to a case of performing a handover only. Instead, the following description can also be applied to a case of receiving PBCH and the like in an initial access procedure and the like. In the following description, for clarity, the first transmission point and the second transmission point are called a serving cell (an aggressor cell) and a target cell (a victim cell), respectively.

Having received a handover command (included in RRC-ConnectionReconfiguration IE) indicating a handover from a serving cell to a target cell, a UE obtains synchronization of the target cell, receives system information transmitted on PBCH and performs a random access procedure to obtain uplink synchronization of the target cell, C-RNTI and the like. In this case, if interference coordination (ICIC, eICIC, feICIC or the like) is performed for the serving cell and the target cell, the UE can obtain system information (e.g., SFN, PHICH configuration (PHICH-config), a downlink bandwidth and the like) of the target cell from the serving cell (In this case, synchronization acquisition via PSS/SSS can be performed by the aforementioned method of obtaining synchronization in interference situation).

More specifically, i) the UE can receive the system information of the target cell with a handover command. In this case, it may receive an SFN offset (or a subframe offset) instead of the SFN. In case of receiving a subframe offset, an SFN relation between the serving cell and the target cell can be signaled/defined in advance. For instance, it may signal/assume that an SFN of the serving cell always equals to or greater than an SFN of the target cell. In this case, if the SFN of the serving cell corresponds to 10 and a subframe offset between the serving cell and the target cell corresponds to 4, the SFN of the target cell corresponding to a subframe index 0 to 2 of the serving cell and the SFN of the target cell corresponding to a subframe index 3 to 9 of the serving cell can be determined by 9 and 10, respectively.

Or, ii) the UE may assume that the system information of the target cell is identical to system information of the serving cell. In other word, the UE may consider the system information of the serving cell as the system information of the target cell. In this case, information on neighbor cells in ICIC relation with the serving cell can be signaled.

Or, iii) it may assume that system information not included in system information received via a handover message and the like is identical to system information of the serving cell. For instance, if SFN (or SFN offset information) is included in a handover message, it may assume that remaining system information (PHICH configuration, a downlink bandwidth and the like) is identical to the system information of the serving cell.

The UE can recognize/identify whether inter-cell interference coordination is performed for the serving cell and the target cell via direct signaling or indirect signaling. The direct signaling may mean signaling of the serving cell indicating that the target cell corresponds to a victim cell in a relation between the target cell and the serving cell. The indirect signaling may mean that the UE recognizes inter-cell interference coordination performed for the serving cell and the target cell when the UE receives signaling related to ICIC. More specifically, the UE can recognize the inter-cell interference coordination performed for the serving cell and the target cell when i) the UE receives a subframe set for restricted measurement, ii) the UE receives ABS configuration, iii) the UE receives adjustment of a threshold related to a criterion of a measurement report and iv) the UE receives signaling indicating not to decode PBCH.

As mentioned in the foregoing description, if the UE obtains the system information transmitted via PBCH from the serving cell, the UE may omit PBCH decoding of the target cell. In other word, in case of performing a handover between cells performing ICIC, although there is no separate signaling, the PBCH decoding can be omitted. Specifically, if the UE receives all or a part of the system information transmitted on PBCH via a handover message and the like or if the UE considers that all or a part of the system information transmitted on PBCH is identical to system information of the serving cell, the UE may omit PBCH decoding for handover.

FIG. 13 is a diagram for a configuration of a transmission point device and a user equipment device according to embodiment of the present invention.

Referring to FIG. 13, a transmission point device 1310 according to the present invention can include a reception module 1311, a transmission module 1312, a processor 1313, a memory 1314, and a plurality of antennas 1315. A plurality of the antennas 1315 means the transmission point device capable of supporting MIMO transmission and reception. The reception module 1311 can receive various signals, a data, and information in UL from the UE. The transmission module 1312 can transmit various signals, a data, and information in DL to the UE. The processor 1313 can control overall operations of the transmission point device 1310.

The processor 1313 of the transmission point device 1310 according to one embodiment of the present invention can operate to implement the aforementioned embodiment of the present invention. Besides, the processor 1313 of the transmission point device 1310 is configured to perform a function of processing information received by the transmission point device 1310, information to be transmitted to an external, and the like. The memory 1314 is configured to store the processed information for a prescribed time and can be substituted by such a configuration element as a buffer (not depicted), or the like.

Subsequently, referring to FIG. 13, the UE 1320 according to the present invention includes a reception module 1321, a transmission module 1322, a processor 1323, a memory 1324, and a plurality of antennas 1325. A plurality of the antennas 1325 means the UE capable of supporting MIMO transmission and reception. The reception module 1321 can receive various signals, a data, and information in DL from the transmission point. The transmission module 1322 can transmit various signals, a data, and information in UL t the transmission point. The processor 1323 can control overall operations of the UE 1320.

The processor 1323 of the UE 1320 according to one embodiment of the present invention can operate to implement the aforementioned embodiment of the present invention. Besides, the processor 1323 of the UE 1320 is configured to perform a function of processing information received by the UE 1320, information to be transmitted to an external, and the like. The memory 1324 is configured to store the processed information for a prescribed time and can be substituted by such a configuration element as a buffer (not depicted), or the like.

Detail configuration of the transmission point device and the UE can be implemented to independently apply the aforementioned contents explained in various embodiments of the present invention or to simultaneously apply two or more embodiments. The overlapped contents are omitted for clarity of explanation.

And, in explaining FIG. 13, explanation on the transmission point device 1310 can be identically applied to a relay device as a main agent of DL transmission or a main agent of UL reception. Explanation on the UE 1320 can be identically applied to a relay device as a main agent of DL reception or a main agent of UL transmission.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to embodiments of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

INDUSTRIAL APPLICABILITY

Embodiments of the present invention mentioned in the foregoing description can be applied to various wireless communication systems.

What is claimed is:

1. A method of performing a handover, by a user equipment, in a wireless communication system, comprising:
   receiving a handover command from a serving cell;
   wherein the serving cell and a target cell perform inter-cell interference coordination, and
   wherein system information of the target cell is received from the serving cell with the handover command,
   obtaining synchronization of the target cell, and
   performing a random access procedure for the target cell according to the handover command;
   wherein the system information includes a subframe offset when a time boundary is matched with each other between the serving cell and the target cell, and
   wherein the synchronization of the target cell is obtained based on a subframe number of the serving cell and the subframe offset.

2. The method of claim 1, wherein the target cell corresponds to a victim cell interfered by the serving cell.

3. The method of claim 1, wherein the user equipment assumes that system information not contained in the system information received with the handover command is identical to system information of the serving cell.

4. The method of claim 1, wherein the user equipment considers system information of the serving cell as the system information of the target cell.

5. The method of claim 1, wherein the system information is transmitted on a physical broadcast channel in the serving cell.

6. The method of claim 1, wherein the user equipment is located in a CRE (cell range extension) region of the target cell.

7. The method of claim 1, wherein the handover command is contained in an Radio Resource Control (RRC) connection reconfiguration information element.

8. The method of claim 1, wherein the user equipment recognizes that the inter-cell interference coordination is performed using signaling indicating that the target cell corresponds to a victim cell.

9. The method of claim 1, wherein the user equipment recognizes that the inter-cell interference coordination is performed when a signal related to one selected from the group consisting of a subframe set for restricted measurement, ABS (almost blank subframe) configuration and adjustment of a threshold associated with a criterion of a measurement report is received.

10. The method of claim 1, wherein the user equipment omits decoding on a physical broadcast channel transmitted from the target cell.

11. A user equipment in a wireless communication system, comprising:
    a reception module; and
    a processor,
    wherein the processor configured to:
    receive a handover command from a serving cell,
    wherein the serving cell and a target cell perform inter-cell interference coordination, and
    wherein system information of the target cell is received from the serving cell with the handover command,
    obtain synchronization of the target cell, and
    perform a random access procedure for the target cell according to the handover command,
    wherein the system information includes a subframe offset when a time boundary is matched with each other between the serving cell and the target cell, and
    wherein the synchronization of the target cell is obtained based on a subframe number of the serving cell and the subframe offset.

* * * * *